United States Patent [19]
Suzuki et al.

[11] Patent Number: 5,151,872
[45] Date of Patent: Sep. 29, 1992

[54] METHOD AND APPARATUS FOR CORRECTING THE OUTPUT OF AN ONBOARD VEHICLE TERRESTRIAL MAGNETISM SENSOR

[75] Inventors: Kiyomi Suzuki; Masaru Chijiiwa, both of Kawagoe, Japan

[73] Assignee: Pioneer Electronic Corporation, Tokyo, Japan

[21] Appl. No.: 556,545

[22] Filed: Jul. 24, 1990

[30] Foreign Application Priority Data

Oct. 17, 1989 [JP] Japan .................................. 1-269386

[51] Int. Cl.⁵ ............................................ G01C 17/38
[52] U.S. Cl. .............................. 364/571.05; 364/457; 364/571.02; 33/356
[58] Field of Search .................. 364/454, 460, 571.02, 364/571.03, 571.04, 571.05, 457; 73/178 R; 340/988; 33/320, 356, 357

[56] References Cited

U.S. PATENT DOCUMENTS

| | | | |
|---|---|---|---|
| 4,445,279 | 5/1984 | Tsushima et al. | 364/571.05 |
| 4,622,754 | 11/1986 | Chujo et al. | 33/356 |
| 4,660,161 | 4/1987 | Okada | 33/356 |
| 4,688,176 | 8/1987 | Hirata | 364/571.04 |
| 4,771,547 | 9/1988 | Akutsu et al. | 33/356 |
| 4,831,563 | 5/1989 | Ando et al. | 364/571.05 |
| 4,841,449 | 6/1989 | Suyama | 364/571.04 |
| 4,852,012 | 7/1989 | Suyama | 364/571.02 |
| 4,862,398 | 8/1989 | Shimizu et al. | 364/571.05 |
| 4,866,627 | 9/1989 | Suyama | 364/571.02 |

Primary Examiner—Vincent N. Trans
Attorney, Agent, or Firm—Wegner, Cantor, Mueller & Player

[57] ABSTRACT

Method and apparatus for correcting the output of an onboard vehicle terrestrial magnetism sensor. An azimuth computation reference circle is obtained from the terrestrial magnetism sensor output, the circle in turn being used to correct the sensor output. When the reference circle is dislodged, the least square method is used to fine a true azimuth computation reference circle.

2 Claims, 2 Drawing Sheets

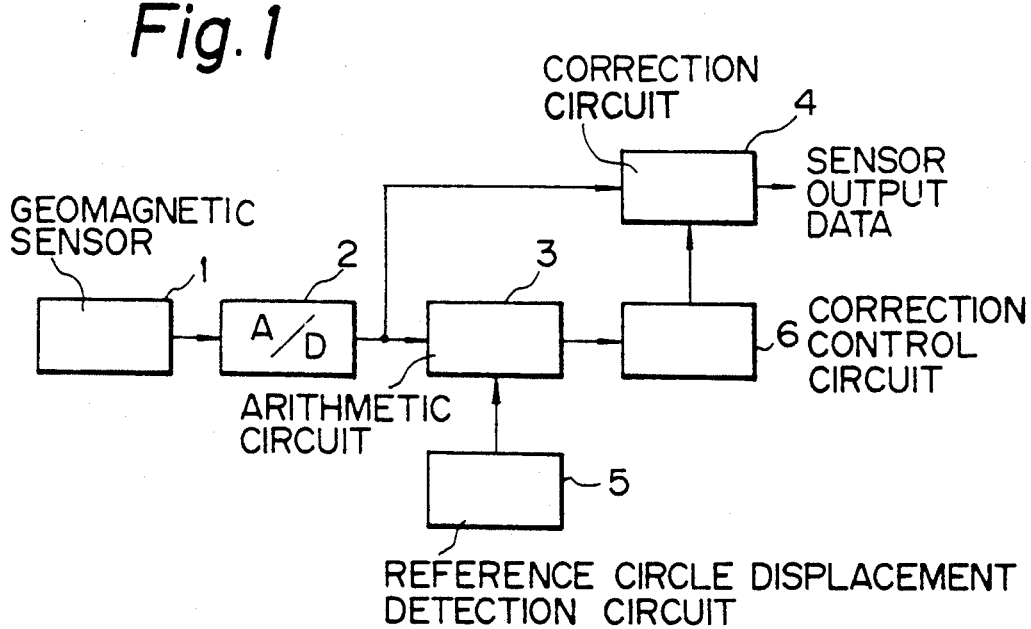
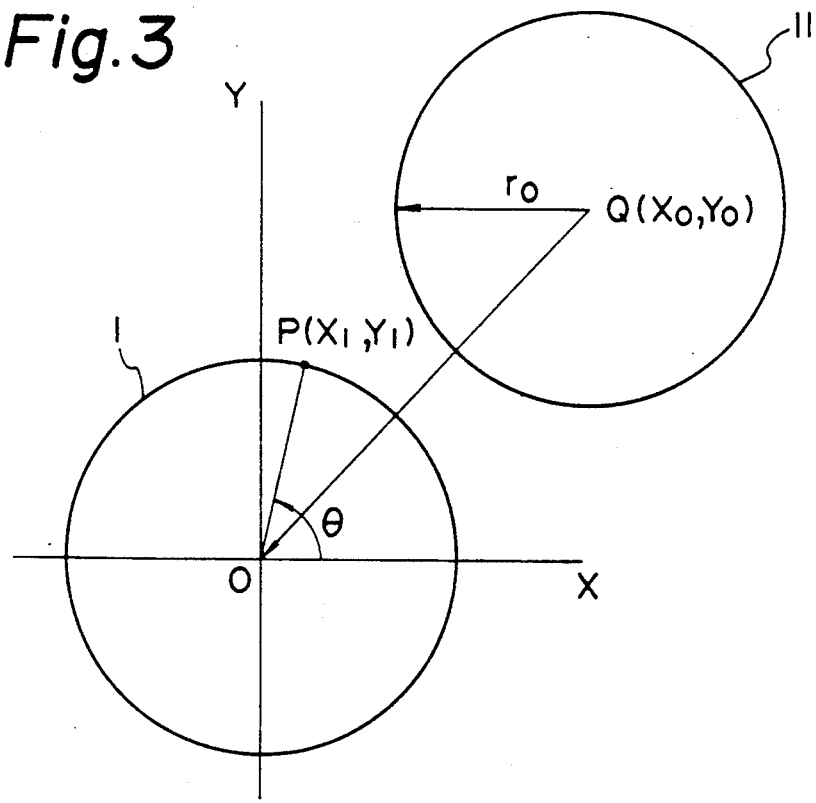

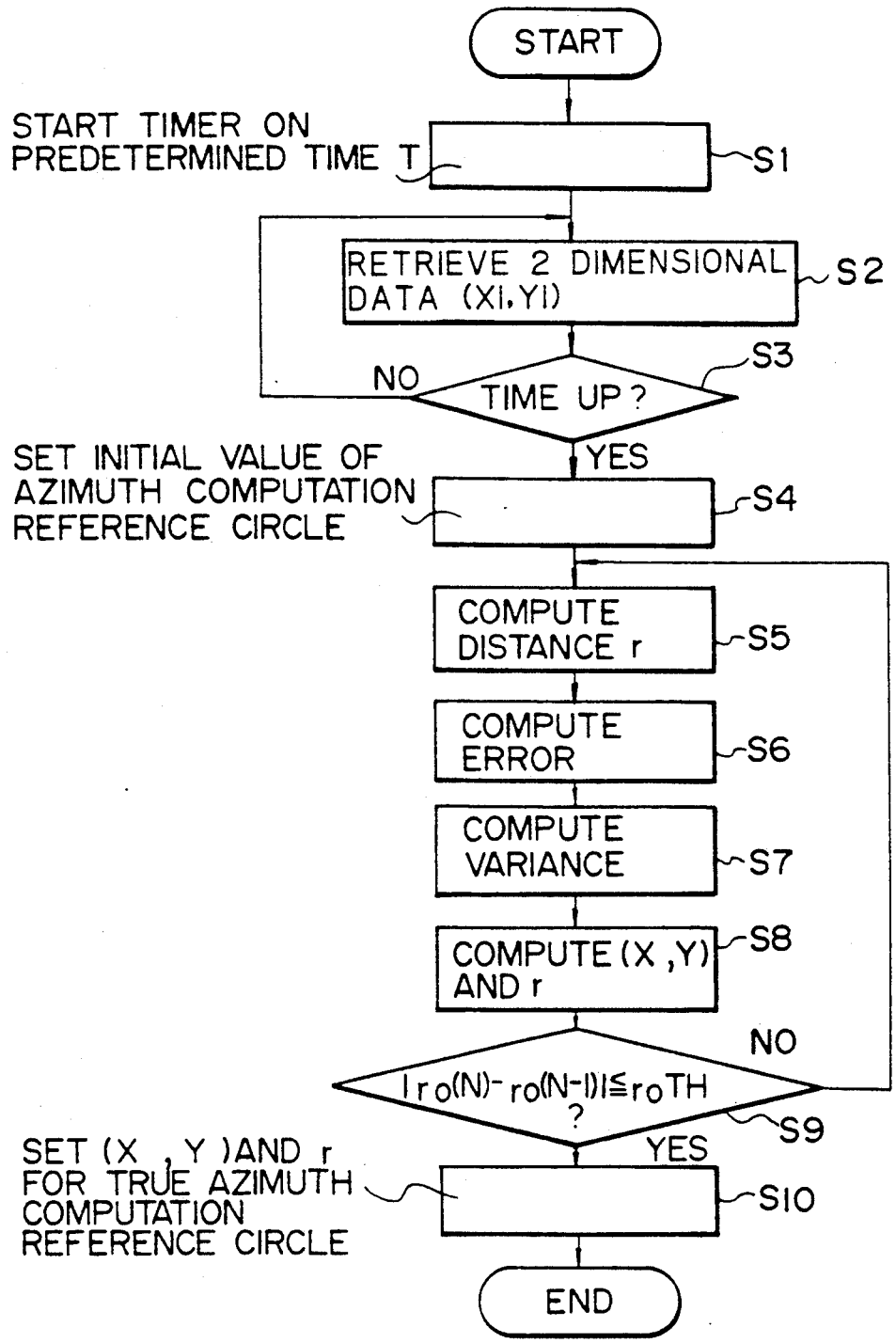

METHOD AND APPARATUS FOR CORRECTING THE OUTPUT OF AN ONBOARD VEHICLE TERRESTRIAL MAGNETISM SENSOR

GROUND OF THE INVENTION

1. Field of the Invention

The present invention relates to method and apparatus for correcting the output of a terrestrial magnetism sensor for use in vehicles.

2. Description of Background Information

Direction information on a vehicle having an onboard navigation apparatus is obtained by digitizing the analog output of a terrestrial magnetism sensor of the apparatus and by suitably computing the digitized data, the sensor being of flux gate compass or other types. In operation, the onboard vehicle navigation apparatus recognizes the current position of the vehicle, and reads from a recording medium a map data group representing a region covering a given area containing the current vehicle position so that an attached display device displays an appropriate map having a center on the vehicle position, the map having road segments on which a vehicle position mark pinpointing the vehicle's position is automatically indicated. In such onboard navigation systems, the terrestrial magnetism sensor is used as a direction sensor for detecting the traveling direction of the vehicle.

The terrestrial magnetism sensor generally comprises a pair of magnetism detecting elements positioned at 90° phase angle to each other on the same plane. The two elements respectively output a voltage proportional to the magnetic flux in either of the two perpendicularly intersecting directions on the same plane. One of the two outputs is plotted on the X axis of a graph and the other on the Y axis. Giving the terrestrial magnetism sensor a full turn on a horizontal plane draws an ellipse on a plane of X-Y rectangular coordinates. The ellipse is drawn because magnetic permeability varies with direction due to the presence of magnetic circuits around the sensor, and because the sensitivity of sensor elements are not uniform. The ellipticity of this drawn figure, i.e., the ratio of the ellipse's major axis to its minor axis, is usually constant. Thus the property of ellipticity may be used to convert the corresponding ellipse into a circle I centered on an origin O of an X—Y rectangular coordinate system, as shown in FIG. 3. If the X axis points to the east and the Y axis to the north, a counterclockwise azimuth $\theta$ at a certain point P $(X_1, Y_1)$ on the circle I from the X axis (i.e., east) is provided by the following equation:

$$\theta = \tan^{-1}(Y_1/X_1) \qquad (1)$$

This terrestrial magnetism sensor is attached to the vehicle body at a predetermined angle relative the lengthwise or crosswise direction of the vehicle. The traveling direction in which the vehicle is running is obtained by executing an operation of the equation (1) for the output data from the X and Y detecting elements of the sensor. To collect the full-circle data, the driver of the vehicle may turn the vehicle 360° if the terrestrial magnetism sensor is fixedly mounted on the vehicle. During the data collection, errors in the attached sensor position and an asymmetry of magnetic circuits around that position may be detected and corrected. However, making a 360° turn with the vehicle requires a wide space and it takes time to do the turn.

Ideally, the terrestrial magnetism sensor should be exposed to only the magnetic flux of terrestrial magnetism. However, magnetic condition of the steel plate of the vehicle is changed (magnetized) when exposed to any strong magnetic fields. The magnetization in turn causes excess magnetic flux. Thus the terrestrial magnetism sensor output is offset. This causes the circle I of FIG. 3 to be translated in parallel by the amount of the change in the magnetization. The result is a circle II. The steel plate of the vehicle body is magnetized when the vehicle passes by a structure with strong magnetic fields, by a railroad crossing, etc. Also observed is the demagnetization of the vehicle body due to mechanical impact.

One method to alleviate these problems encountered when the terrestrial magnetism sensor is fixed to the vehicle is to remove the effect of magnetization or demagnetization of the steel plate of the vehicle body so as to detect the vehicle's direction accurately, as disclosed in Japanese Patent Laid-open No. 57-28208. This method is based on the recognition that the distance between the origin 0 of the circle I and the center Q of the circle II (obtained by turning the vehicle 360°) represents the amount of the offset caused by the magnetization of the steel plate of the vehicle body. The output data from both detecting elements of the sensor are corrected so that the center Q moves to and coincides with the origin 0. In this manner, the amount of the magnetization-triggered offset is compensated.

More specifically, the center Q of the circle II drawn by the output data from both detecting elements of the sensor is initially set apart from the origin O. Therefore, the output data from both detecting elements by the vehicle's 360° turn are corrected by ellipticity. Maximum values Xmax and Ymax as well as minimum values Xmin and Ymin of the output data items X and Y, respectively, are obtained from output data after the correction. The maximum and minimum values are placed in the following equation (2) to calculate coordinates $(X_o, Y_o)$ of the center Q.

$$\left. \begin{array}{l} X_o = (X\text{max} + X\text{min})/2 \\ Y_o = (Y\text{max} + Y\text{min})/2 \end{array} \right\} \qquad (2)$$

In turn, the coordinates $(X_o, Y_o)$ of the center are used to correct the output data X, Y of the magnetism detecting elements of the terrestrial magnetism sensor.

While the vehicle is running, the position of the circle in the X-Y rectangular coordinate system can change frequently. It is thus not very practical to obtain the center of the circle by making a 360° turn with the vehicle every time the steel plate thereof is magnetized or demagnetized.

From these developments there arose a need for a method for finding the center of the circle from a partial arc instead of from a full circle. This method allows the navigation apparatus of the vehicle to find the center of the circle using the output data from its sensor in ordinary driving situations such as making turns and running meandering roads. The algorithm currently adopted for this method involves selecting three items representing three points from among the sensor data. The center and the two other points are connected by two straight lines. The two straight lines are respectively cut in two by a perpendicular bisector. The point of intersection formed by the two bisectors is used as the center of a new circle. One disadvantage of this method is that the accuracy of the obtained values varies depending on how the three data items are selected. This is because the data contain errors stemming from local terrain-caused geomagnetic disturbances and from geomagnetic irregularities in varying traffic circumstances.

OBJECT AND SUMMARY OF THE INVENTION

It is therefore an object of the present invention to provide method and apparatus for correcting the output of an onboard vehicle navigation apparatus, the method being so devised as to minimize the error in the values obtained using as many available data possible.

According to the present invention, method and apparatus are provided whereby the output of the terrestrial magnetism sensor is corrected on the basis of an azimuth computation reference circle obtained from that sensor output. The azimuth computation reference circle has a radius of $r_0$ and a center with coordinates $(x_0, y_0)$. Given these initial values, a distance $r_i$ between the center $(x_0, y_0)$ and each of "n" data items $(x_i, y_i)$ of the terrestrial magnetism sensor output is computed. The difference between the radius $r_0$ and the distance $r_i$ is squared to give a value $\sigma^2$. Then values $x_0, y_0$ and $r_0$ are obtained so that the value $\sigma^2$ becomes minimal against changes in the values x. y and r. The values $x_0$ and $y_0$ thus acquired are used as the coordinates of the center of the true azimuth computation reference circle, $r_0$ being the radius thereof.

As indicated, the azimuth computation reference circle is obtained from the output of the terrestrial magnetism sensor, the reference circle serving as the basis for correcting the sensor output. Where the azimuth computation reference circle is displaced due to magnetization o demagnetization caused by disturbed external magnetic fields, the true azimuth computation reference circle is acquired through the least square method.

BRIEF DESCRIPTION OF THE DRAWINGS

FIG. 1 is a block diagram of a preferred embodiment of the method according to the present invention and for use with an onboard vehicle navigation apparatus using a terrestrial magnetism sensor;

FIG. 2 is a flowchart of steps to compute the radius and the coordinates of the center of an azimuth computation reference circle; and FIG. 3 is a view showing the loci drawn with data output from the terrestrial magnetism sensor.

DESCRIPTION OF THE PREFERRED EMBODIMENT

The preferred embodiment of the present invention will now be described with reference to the accompanying drawings.

In FIG. 1, the analog output from a terrestrial magnetism sensor 1, illustratively operating on the flux gate principle, is digitized by an A/D (analog-to-digital) converter 2. The digitized output is supplied to a computing circuit 3 and a correction circuit 4. The computing circuit 3 may comprise a microcomputer. In response to the output from a reference circle displacement detection circuit 5, the computing circuit 3 typically admits output data from the terrestrial magnetism sensor 1 for a predetermined time T, and performs using the admitted data various operations to find a radius $r_0$ and coordinates of a center $(x_0, y_0)$ for a true reference circle for azimuth computation. These operations will be described later in further detail. A correction control circuit 6 provides the correction circuit 4 with the correction information based on the true reference circle obtained by the computing circuit 3, so as to correct the output data from the terrestrial magnetism sensor 1. In FIG. 1, the correction circuit 4 and the correction control circuit 6 are shown to be independent of the computing circuit 3. Alternatively, the first two circuits may each comprise a microcomputer integral to the computing circuit 3.

The reference circle displacement detection circuit 5 checks if the reference circle for azimuth computation is dislodged from where it should be. In the onboard vehicle navigation apparatus, the circuit 5 detects the reference circle displacement by checking if the vehicle is in a location far away from the road where it should be running, or if the vehicle has failed to make a turn at a crossing where it should have. Alternatively the reference circle displacement detection circuit 5 is omitted; instead, the user may determine if any of the above-mentioned operations has taken place, and may supply the computing circuit 3 with the information to that effect.

Referring to the flowchart of FIG. 2, there will now be described the steps taken by the processor making up the computing circuity 3 in order to compute the radius $r_0$ and the center coordinates $(x_0, y_0)$ of the azimuth computation reference circle. These steps constitute a routine that is called and executed every time a detection output is made by the reference circle displacement detection circuit 5 while the vehicle is running.

When the reference circle displacement detection circuit 5 issues its output, the processor enters step S1, starting a timer for timing a predetermined time T. In step S2, the processor retrieves two-dimensional data $(x_i, y_i)$, i.e., the output data from the terrestrial magnetism sensor 1. In step S3, the processor continues to retrieve the data during the predetermined time T, i.e., until the timing operation by the timer is finished. In step S4, the processor illustratively determines initial values of an azimuth computation reference circle $C_o$ based on "n" two-dimensional data items $(x_i,y_i)$ gained during the time T. How to determine these initial values will be further described later. The "n" two-dimensional data $(x_i, y_i)$ are assumed to exist away from the circumference of the azimuth computation reference circle Co by distances of uniform distribution (where i = 1, 2, . . . , n).

In step S5, the processor obtains a distance $r_i$ of each sampled point from the center $(x_0, y_0)$ of the reference circle $C_o$. Because the equation at a point (x, y) on the circumference of the circle is $$(x-x_0)^2+(y-y_0)^2=r_o^2$$

the distance $r_i$ is obtained from the equation of:

$$r_i=\sqrt{(x_i-x_0)^2+(y_i-y_0)^2}$$

In step S 6, an error $\sigma_i$ of the acquired radius is obtained from the equation of:

$$\sigma_i=r_i-r_o$$

In step S7, a variance $\sigma^2$ is obtained from the equation of :

$$\sigma^2 = \sum_{i=1}^{n} \sigma_i^2 = \sum_{i=1}^{n} (r_i - r_o)^2$$

$$= \sum_{i=1}^{n} (r_i^2 - 2r_i r_o - r_o^2)$$

$$= \sum_{i=1}^{n} \{(x_i - x_o)^2 - (y_i - y_o)^2$$

$$- 2\sqrt{(x_i - x_o)^2 - (y_i - y_o)^2} \cdot r_o - r_o^2\}$$

In step S8, the processor obtains a radius $r_o$ and center coordinates $(x_o, y_o)$ such that the variance $\sigma^2$ representing the square of the difference between the radius $r_o$ and the distance $r_i$ becomes minimal with respect to the changes in values x, y and r. The variance $\sigma^2$ is minimized by partially differentiating $\sigma^2$ with x, y and r, each relation being set for 0 (=0), and by solving the simultaneous partial differential equations as follows:

$$\frac{\partial \sigma^2}{\partial x_o} =$$

$$\frac{\partial}{\partial x_o}\left( nx_o^2 - 2x_o \sum_{i=1}^{n} x_i - 2x_o \sum_{i=1}^{n} \sqrt{(x_i - x_o)^2 - (y_i - y_o)^2} \right) =$$

$$2nx_o - 2\sum_{i=1}^{n} x_i - 2r_o \sum_{i=1}^{n} \frac{x_o - x_i}{\sqrt{(x_i - x_o)^2 - (y_i - y_o)^2}} = 0$$

$$\frac{\partial \sigma^2}{\partial y_o} = 2ny_o - 2\sum_{i=1}^{n} y_i - 2r_o \sum_{i=1}^{n} \frac{y_o - y_i}{\sqrt{(x_i - x_o)^2 - (y_i - y_o)^2}} = 0$$

$$\frac{\partial \sigma^2}{\partial r_o} = \frac{\partial}{\partial r_o} \sum_{i=1}^{n} \{r_o^2 - 2r_o \sqrt{(x_i - x_o)^2 - (y_i - y_o)^2}\} =$$

$$2nr_o - 2\sum_{i=1}^{n} \sqrt{(x_i - x_o)^2 - (y_i - y_o)^2} = 0$$

After the above equation are solved in successive approximation, the following equations are set:

$$\frac{\partial \sigma^2}{\partial x_o} = f(x_o, y_o, r_o)$$

$$\frac{\partial \sigma^2}{\partial y_o} = g(x_o, y_o, r_o)$$

$$\frac{\partial \sigma^2}{\partial r_o} = h(x_o, y_o, r_o)$$

When $x_o$, $y_o$ and $r_o$ take on their respective true values $x_{oo}$, $y_{oo}$ and $r_{oo}$, the following results:

f $(x_{oo}, y_{oo}, r_{oo}) = 9$ g $(x_{oo}, y_{oo}, r_{oo}) = 9$ h $(x_{oo}, y_{oo}, r_{oo}) = 9$

If $\Delta f_N$, $\Delta g_N$ and $\Delta h_N$ represent the errors of the values f, g and h by the N-th estimate valuess $x_o(N)$, $y_o(N)$ and $r_o(N)$ for $x_o$, $y_o$ and $r_o$, what is obtained is:

$\Delta f_N = f(x_o(N), y_o(N), r_o(N))$ $\Delta g_N = g(x_o(N), y_o(N), r_o(N))$ $\Delta h_N = h(x_o(N), y_o(N), r_o(N))$ Where the errors $\Delta x_o(N)$, $\Delta y_o(N)$ and $\Delta r_o(N)$ relative to the true values $x_o(N)$, $y_o(N)$ and $r_o(N)$ are sufficiently small, the following approximations can be made:

$$\begin{bmatrix} \Delta f_N \\ \Delta g_N \\ \Delta h_N \end{bmatrix} = \begin{bmatrix} \left|\frac{\partial f}{\partial x_o}\right|_N & \left|\frac{\partial f}{\partial y_o}\right|_N & \left|\frac{\partial f}{\partial r_o}\right|_N \\ \left|\frac{\partial g}{\partial x_o}\right|_N & \left|\frac{\partial g}{\partial y_o}\right|_N & \left|\frac{\partial g}{\partial r_o}\right|_N \\ \left|\frac{\partial h}{\partial x_o}\right|_N & \left|\frac{\partial h}{\partial y_o}\right|_N & \left|\frac{\partial h}{\partial r_o}\right|_N \end{bmatrix} \begin{bmatrix} \Delta x_o(N) \\ \Delta y_o(N) \\ \Delta r_o(N) \end{bmatrix}$$

In the foregoing, $$\left|\frac{\partial f}{\partial x_o}\right|_N$$

represents the value of $$\frac{\partial f}{\partial x_o}$$

when $x_o = x_o(N)$, $y_o = y_o(N)$. The same also applies to the rest.

Therefore, the values $x_o$, $y_o$ and $r_o$ converge on $x_{oo}$, $y_{oo}$ and $r_{oo}$, respectively, when updated as follows:

$$\begin{bmatrix} x_o(N) \\ y_o(N) \\ r_o(N) \end{bmatrix} = \begin{bmatrix} x_o(N-1) \\ y_o(N-1) \\ r_o(N-1) \end{bmatrix} - \begin{bmatrix} \Delta x_o(N-1) \\ \Delta y_o(N-1) \\ \Delta r_o(N-1) \end{bmatrix} =$$

$$\begin{bmatrix} x_o(N-1) \\ y_o(N-1) \\ r_o(N-1) \end{bmatrix} - \begin{bmatrix} \left|\frac{\partial f}{\partial x_o}\right|_{N-1} & \left|\frac{\partial f}{\partial y_o}\right|_{N-1} & \left|\frac{\partial f}{\partial r_o}\right|_{N-1} \\ \left|\frac{\partial g}{\partial x_o}\right|_{N-1} & \left|\frac{\partial g}{\partial y_o}\right|_{N-1} & \left|\frac{\partial g}{\partial r_o}\right|_{N-1} \\ \left|\frac{\partial h}{\partial x_o}\right|_{N-1} & \left|\frac{\partial h}{\partial y_o}\right|_{N-1} & \left|\frac{\partial h}{\partial r_o}\right|_{N-1} \end{bmatrix}^{-1}$$

$$\begin{bmatrix} f(x_o(N-1), y_o(N-1), r_o(N-1)) \\ g(x_o(N-1), y_o(N-1), r_o(N-1)) \\ h(x_o(N-1), y_o(N-1), r_o(N-1)) \end{bmatrix}.$$

where, N=1,2,3, etc.

Having computed the values $x_o(N)$, $y_o(N)$ and $r_o(N)$, the processor goes to step S9. In step S9, a check is made if the difference between $r_o(N)$, the current value of $r_o$, and $r_o(N-1)$, the previous value thereof, is less than a predetermined value $r_o$th. If $|r_o(N)-r_o(N)| \leq r_o$th, the processor proceeds to step S10. In step S10, the whole series of arithmetic operations comes to an end, and the current values $r_o(N)$ and $(x_o(N), y_o(N))$ are used respectively as the radius and the center coordinates of the true azimuth computation reference circle. If $|r_o(N) - r_o(N-1)| > r_o\text{th}$, the processor returns to step S5 and repeats the computing steps therefrom.

What follows is a further description of how to determine the initial values of the azimuth computation reference circle in step S4.

There are illustratively four techniques to determine the initial coordinates $(x_o(0), y_o(0))$ of the center for the azimuth computation reference circle. These techniques are:

(1) The averages of values $x_i$ and $y_i$ $(i=1,2,\ldots,n)$ are used as the initial values.

(2) The greatest difference between the maximum and the minimum of values $x_i$ $(i=1,2,\ldots,n)$ and $y_i$ $(i=1,2,\ldots,n)$ is used to determine two extreme points. A third point that is as close to the center between these two points as possible is obtained. The three points make up a triangle of which the coordinates of the center of gravity are used as the initial values.

(3) The extreme two points found by technique (2) are connected by a straight line around which the third point is mirrored, the coordinates of the resulting point being used as the initial values.

(4) The extreme two points obtained by technique (2) are each connected to the third point by a straight line, the two lines each being intersected by a perpendicular bisector. The two bisectors form a point of intersection whose coordinates are used as the initial value. There are illustratively two techniques to determine the initial radius $r_o(0)$ of the azimuth computation reference circle. These techniques are:

(1) The average of the distances between the initial center with the coordinates $(x_o(0), y_o(0))$ and the point with coordinates $(x_i, Y_i)$, where $i=1,2,\ldots,n$, is used as the initial radius.

(2) A 360° turn made upon activation of the onboard vehicle navigation apparatus produces a circle whose radius is used as the initial radius.

With this embodiment, the decision in step S9 on whether or not to discontinue the repeat arithmetic operations is made contingent on whether the absolute difference between the current radius $r_o(N)$ and the previous one $r_o(N-1)$, is less than the predetermined value $r_o\text{th}$. One alternative to this scheme is to make the decision in step S9 just as the absolute value in question turns from decrease to increase. Another alternative is to discontinue the repeat operations when a predetermined iteration count ($N \leq N\text{max}$) is reached. A further alternative is to make the decision if a change value $|\sigma^2(N) - \sigma^2(N-1)|$ of the variance $\sigma^2$ is smaller than a predetermined value $\sigma^2+h$.

With this embodiment, the admission of two-dimensional data $(x_i, y_i)$ in step S2 is performed for the predetermine time T. Alternatively, the two-dimensional data may be admitted until the vehicle has traveled a predetermined distance. Another alternative is to detect the vehicle having made a turn when the two-dimensional data $(x_i, y_i)$ are simultaneously and consecutively changed in excess of a predetermined range, the changed data being used for the purpose of correction.

It will be apparent from the above description that the present invention achieves the object set forth at the beginning of the specification. That is, an azimuth computation reference circle is obtained from the output of the terrestrial magnetism sensor in the onboard vehicle navigation apparatus, the circle being used to correct the sensor output. If the azimuth computation reference circle is dislodged from where it should be due to magnetization or demagnetization stemming from external magnetic field disturbances, the least square method is used to find a true azimuth computation reference circle that minimizes the error in coordinate values obtained from as many available data as possible. While the present invention has been shown and described in connection with a particular preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of the present invention.

What is claimed is:

1. A method for correcting the output of a terrestrial magnetism sensor mounted on a vehicle comprising the steps of:

generating an output from the terrestrial magnetism sensor;

detecting an error in the output of the terrestrial magnetism sensor caused by extraneous magnetic influence;

selecting a plurality of data pairs $x_o$, $y_o$ form the output of the terrestrial magnetism sensor;

determining from said plurality of data pairs $x_o$, $y_o$ an initial radius $r_o$ and initial center coordinates $x_o$, $y_o$ of an initial azimuth computation reference circle;

computing a distance $r_o$ between each of said plurality of data pairs $x_o$, $y_o$ and said initial center coordinates $x_o$, hd o;

calculating a difference between each distance $r_o$ and said initial radius $r_o$;

obtaining a variance $\sigma^2$ from squares of the calculated differences;

determining an updated radius $r'_o$ and updated center coordinates $x'_o$, $y'_o$ of the azimuth computation reference circle such that said variance $\sigma^2$ is minimized with respect to changes in coordinates x, y and radius r;

establishing an updated azimuth computation reference circle from said updated radius $r'_o$ and said updated center coordinates $x'_o$, $y'_o$; and correcting the output of the terrestrial magnetism sensor using said updated azimuth computation reference circle.

2. An apparatus for correcting the output of an onboard vehicle terrestrial magnetism sensor mounted on a vehicle using an azimuth computation reference circle obtained form said output, said apparatus comprising:

vehicle terrestrial magnetism sensor for generating an output signal;

detecting means for detecting an error in the output of the vehicle terrestrial magnetism sensor caused by extraneous magnetic influence;

input means responsive to said detecting means for inputting a plurality of data pairs $x_i$, $x_i$ from the output of the terrestrial magnetism sensor when an error is detected;

initial value setting means for setting an initial radius $r_o$ and initial center coordinates $x_o$, $y_o$ from an initial azimuth computation reference circle on the basis of said plurality of data pairs $x_i$, $y_i$;

distance calculating means for calculating a distance $r_i$ between each of said plurality of data pairs $x_i$, $y_i$ and said initial center coordinates $x_o$, $y_o$;

difference calculating means for calculating a difference between each distance r and said initial radius $r_o$;

variance calculating means for calculating a variance $\sigma^2$ from squares of the calculated differences;

updated value determining means for determining an updated radius $r'_o$ and updated center coordinates $x'_o, y'_o$ of the azimuth computation reference circle such that said variance $\sigma^2$ is minimized with respected to changes in coordinates x, y and radius r;

updated reference circle determining means for determining an updated azimuth computation reference circle from said updated radius $r'_o$ and said updated center coordinates $x'_o, y'_o$; and correction means for correcting the output of the terrestrial magnetism sensor using updated azimuth computation reference circle.

* * * * *